US011739939B2

(12) United States Patent
Hwang (10) Patent No.: US 11,739,939 B2
(45) Date of Patent: Aug. 29, 2023

(54) SELF-ASSEMBLY BRAZIER FOR CAMPING

(71) Applicant: Eun Mi Hwang, Wonju-si (KR)

(72) Inventor: Eun Mi Hwang, Wonju-si (KR)

(*) Notice: Subject to any disclaimer, the term of this patent is extended or adjusted under 35 U.S.C. 154(b) by 339 days.

(21) Appl. No.: 17/134,304

(22) Filed: Dec. 26, 2020

(65) Prior Publication Data

US 2022/0090791 A1    Mar. 24, 2022

(30) Foreign Application Priority Data

Sep. 21, 2020  (KR) .................. 10-2020-0121200

(51) Int. Cl.
| *F24C 1/16* | (2021.01) |
| *A47J 33/00* | (2006.01) |
| *A47J 37/07* | (2006.01) |
| *F24B 3/00* | (2006.01) |
| *F24C 1/06* | (2021.01) |

(52) U.S. Cl.
CPC .................. *F24C 1/16* (2013.01); *A47J 33/00* (2013.01); *A47J 37/0763* (2013.01); *F24B 3/00* (2013.01); *F24C 1/06* (2013.01); *A47J 2037/0777* (2013.01)

(58) Field of Classification Search
CPC ... F24B 3/00; F24B 1/003; A47J 33/00; A47J 37/0763; A47J 2037/0777; F24C 1/06; F24C 1/16
See application file for complete search history.

(56) References Cited

U.S. PATENT DOCUMENTS 4,524,751 A * 6/1985 Hoglund .................. F24C 3/14
126/41 R
2018/0195734 A1* 7/2018 Wanderscheid ...... F24C 15/083

FOREIGN PATENT DOCUMENTS

| JP | 3216170 B2 | * | 10/2001 |
| KR | 20-0469514 | | 10/2013 |
| KR | 20-0479870 | | 3/2016 |
| KR | 20160039840 | * | 4/2016 |
| KR | 20200092073 | * | 8/2020 |

* cited by examiner

*Primary Examiner* — Alfred Basichas (57) ABSTRACT

Disclosed herein is a self-assembly brazier for camping. The self-assembly brazier for camping includes: a main body including a base plate arranged on the ground, an ash tray arranged to be spaced apart from the base plate by a pair of support legs vertically arranged at both sides of the base plate, a pair of side coupling wings foldably coupled to both sides of an upper surface of the ash tray, and a storage space formed between the base plate and the ash tray; and a pair of dual panels detachably fit and coupled between the side coupling wings when the side coupling wings are vertically unfolded relative to the ash tray, so as to form a combustion space together with the ash tray. The brazier further includes a combustion plate detachably arranged in the combustion space to which the dual panels are coupled, and having an upper surface on which fuel is arranged.

1 Claim, 12 Drawing Sheets

SELF-ASSEMBLY BRAZIER FOR CAMPING

CROSS-REFERENCE TO RELATED APPLICATIONS

This patent application claims priority under 35 U.S.C. § 119 to Korean Patent Application No. 10-2020-0121200 filed on Sep. 21, 2020, the entire contents of which are incorporated by reference herein.

TECHNICAL FIELD

The present invention relates to a self-assembly brazier for camping, and more particularly, to a self-assembly brazier for camping, which is easy to assemble and store and can induce complete combustion of fuel.

BACKGROUND

The number of people who enjoy camping on weekends is increasing, and so, the demand of camping supplies is also increasing.

Out of such camping supplies, a brazier is used to heat around the brazier or to cook food by burning firewood or fuel outdoors.

A conventional brazier includes a main body having a combustion space for burning fuel, such as firewood or charcoal, a grill put on the main body, and an ash tray disposed below the main body to receive ash generated after the combustion of fuel.

The conventional brazier is manufactured into a predetermined size. Therefore, in case of need of a large-sized brazier, there is inconvenience that a user has to have or buy a brazier of the required size. Moreover, in case that a plurality of braziers are prepared, they occupy a wide space during carrying and storing.

Furthermore, the conventional brazier is heated during the combustion of fuel since being made of a metallic material. Therefore, a user cannot use the conventional brazier on a table due to the risk of fire but has to use the brazier on the ground. So, the user who is sitting on a camping chair has to bend his or her back in order to use the brazier on the ground, and it puts strain on his or her body.

Additionally, in case of the conventional brazier, because outdoor air is introduced below the fuel just once, a sufficient oxygen necessary for burning fuel is not supplied. So, the conventional brazier causes incomplete combustion since the fuel burns just once.

The incompletely burnt combustion gas generates not only hydrogen and carbon dioxide but also carbon monoxide due to lack of oxygen, and lowers thermal efficiency per unit fuel in comparison with complete combustion. The conventional brazier has a disadvantage in that temperature of fire is low, food cooking time increases, and fuel consumption is also increased since thermal efficiency is low.

SUMMARY

Accordingly, the present invention has been made to solve the above-mentioned problems occurring in the prior arts, and it is an object of the present invention to provide a self-assembly brazier for camping, which is easy to assemble and store and can induce complete combustion of fuel.

It is another object of the present invention to provide a self-assembly brazier for camping which is usable even on a table.

It is a further object of the present invention to provide a self-assembly brazier for camping which can induce complete combustion of fuel.

It is a still further object of the present invention to provide a self-assembly brazier for camping which can be used for various purposes by selectively using various kits.

To accomplish the above object, according to the present invention, there is provided a self-assembly brazier for camping including: a main body including a base plate arranged on the ground, an ash tray arranged to be spaced apart from the base plate by a pair of support legs vertically arranged at both sides of the base plate, a pair of side coupling wings foldably coupled to both sides of an upper surface of the ash tray, and a storage space formed between the base plate and the ash tray; and a pair of dual panels detachably fit and coupled between the side coupling wings when the side coupling wings are vertically unfolded relative to the ash tray, so as to form a combustion space together with the ash tray.

Additionally, the brazier further includes a combustion plate detachably arranged in the combustion space to which the dual panels are coupled, and having an upper surface on which fuel is arranged.

As described above, the self-assembly brazier for camping according to the present invention can minimize its volume and is easy to store since the dual panels, the combustion plate and the roasting plate are received in the main body.

Moreover, the self-assembly brazier for camping according to the present invention is convenient since being completely assembled by the simple process of unfolding a pair of the side coupling wings, fitting a pair of the dual panels and putting the combustion plate thereon.

Furthermore, the self-assembly brazier for camping according to the present invention can reduce the user's physical strain since having the floor made of wood through which heat is not transferred so that the brazier can be arranged not only on the ground but also on a table.

Additionally, the self-assembly brazier for camping according to the present invention can induce complete combustion to minimize thermal efficiency per unit fuel since supplying not only the outdoor air supplied from below the fuel but also second air of elevated temperature above the fuel.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIGS. 7A to 8C are exemplary views showing a process that the self-assembly brazier for camping according to the present invention is assembled.

DETAILED DESCRIPTION OF THE PREFERRED EMBODIMENT

Hereinafter, preferred embodiments of the present invention will now be described in detail with reference to the attached drawings, in which like reference numbers denote corresponding parts throughout the drawings.

The terms "comprising" and "including" in the discussion directed to the present invention and the claims are used in an open-ended fashion and thus should be interrupted to mean "including", but not limited thereto.

Figure 1:
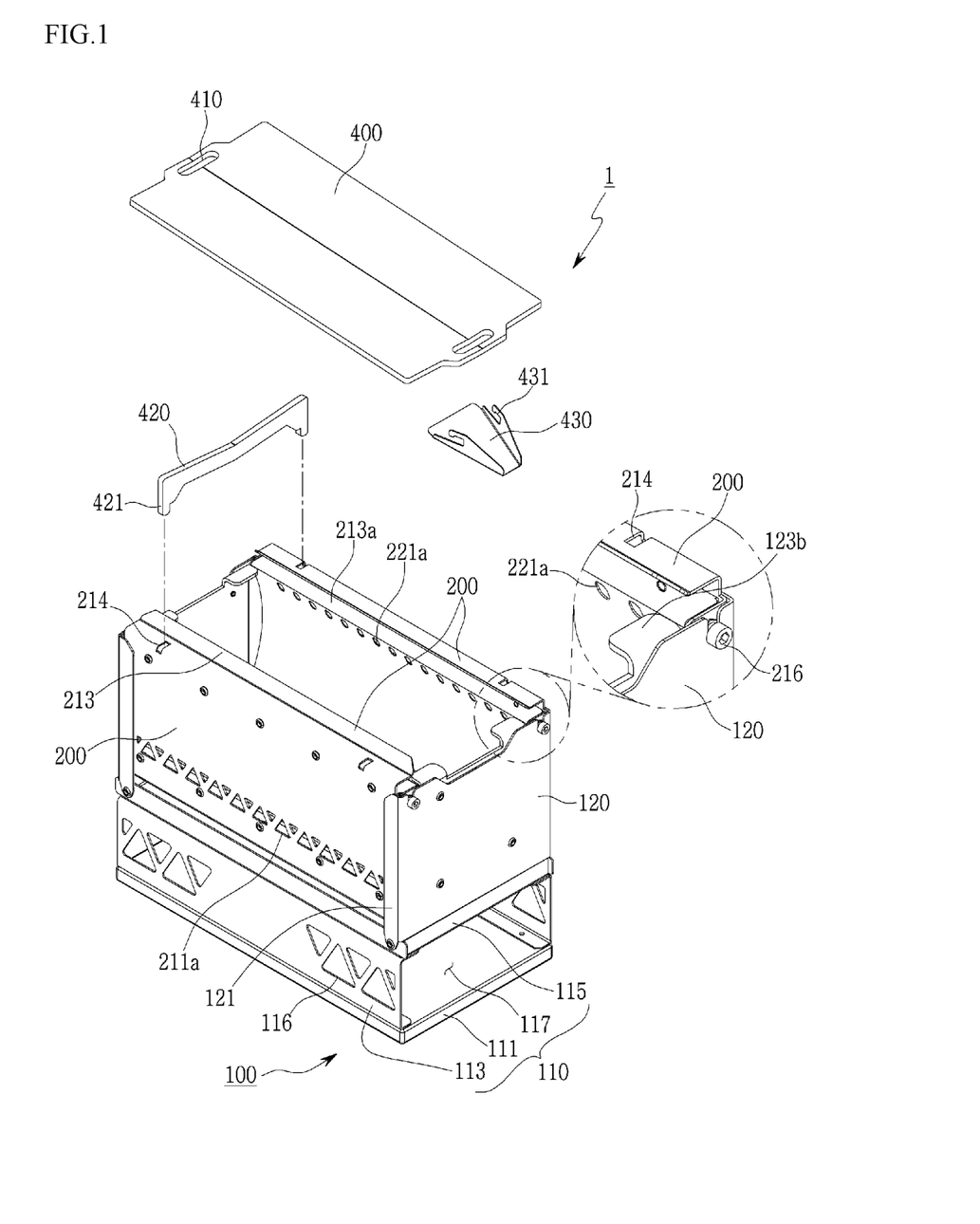
FIG. 1 is a perspective view showing an external structure of a self-assembly brazier for camping according to the present invention.
Figure 2:
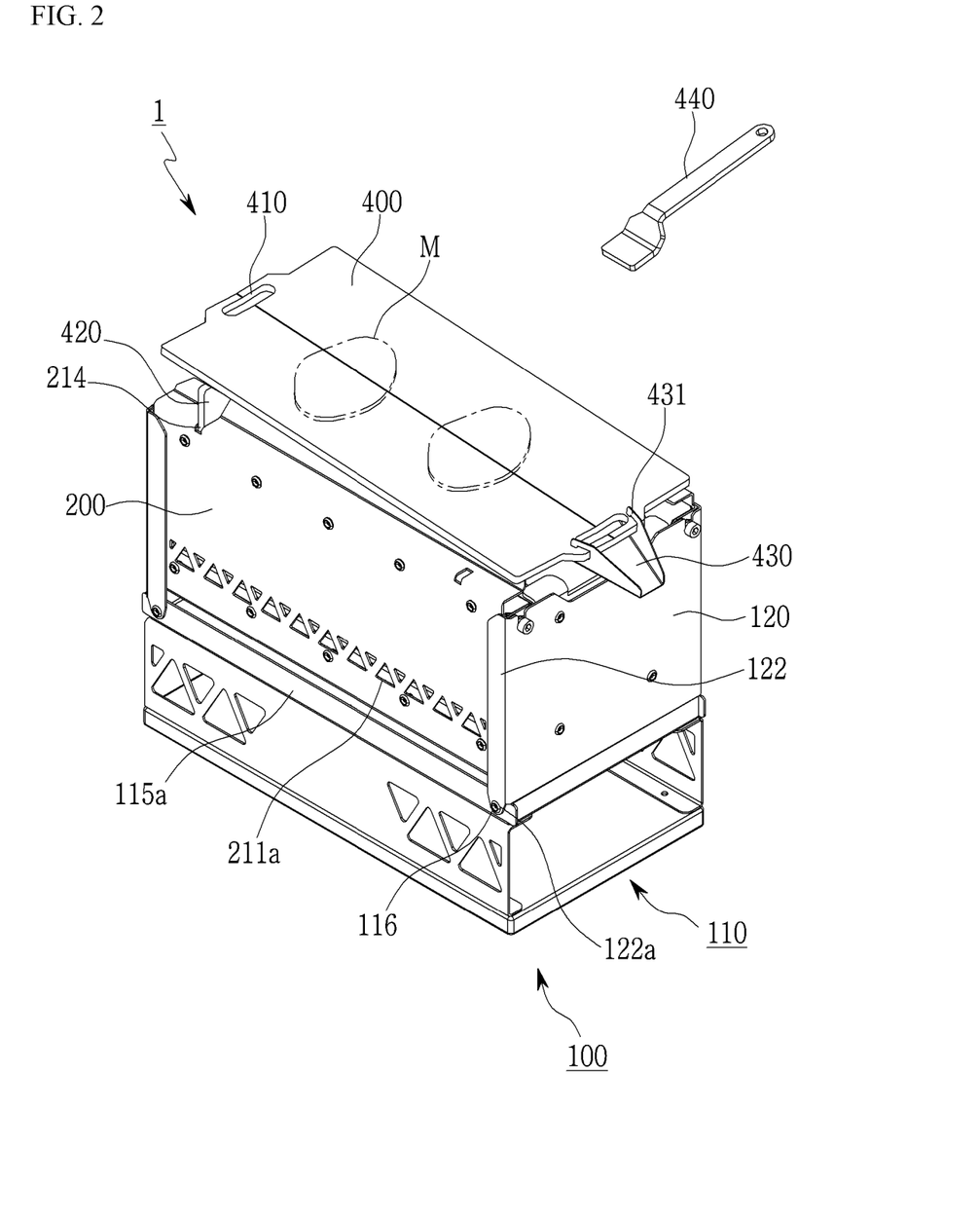
FIG. 2 is a perspective view showing a roasting plate is combined with the self-assembly brazier for camping according to the present invention.
Figure 3:
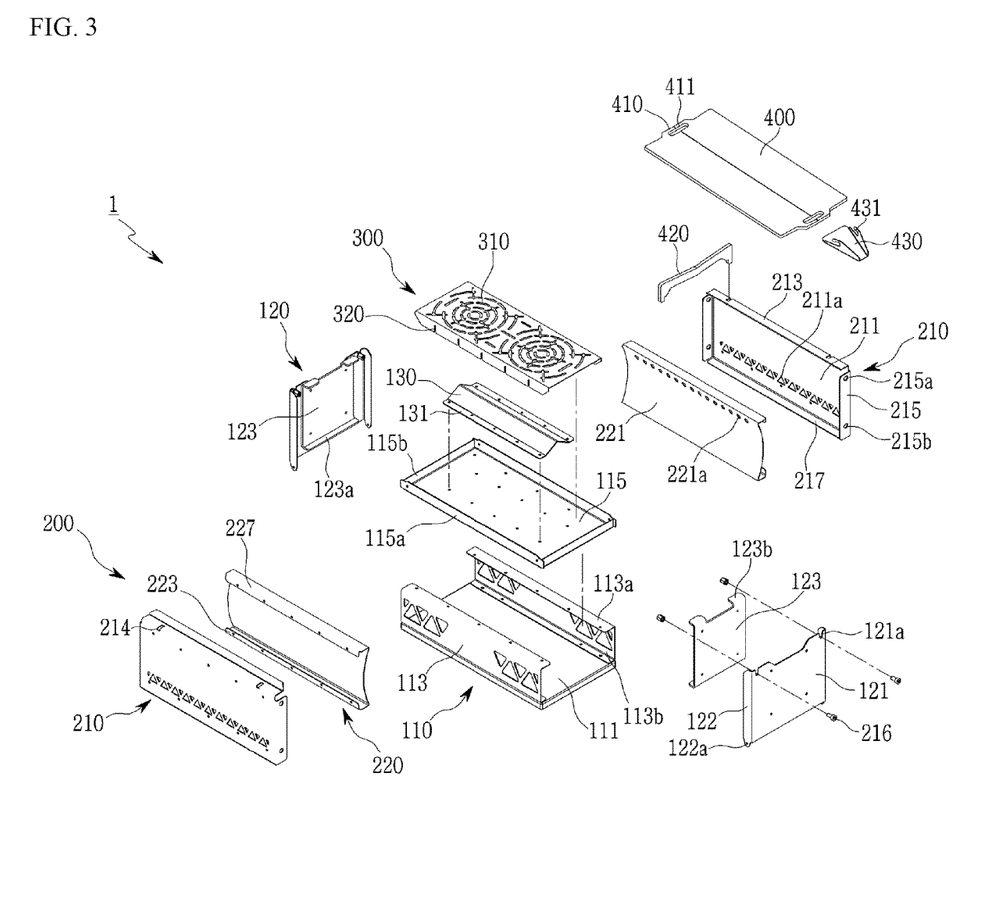
FIG. 3 is an exploded perspective view showing a structure of the self-assembly brazier for camping according to the present invention.
Figure 4:
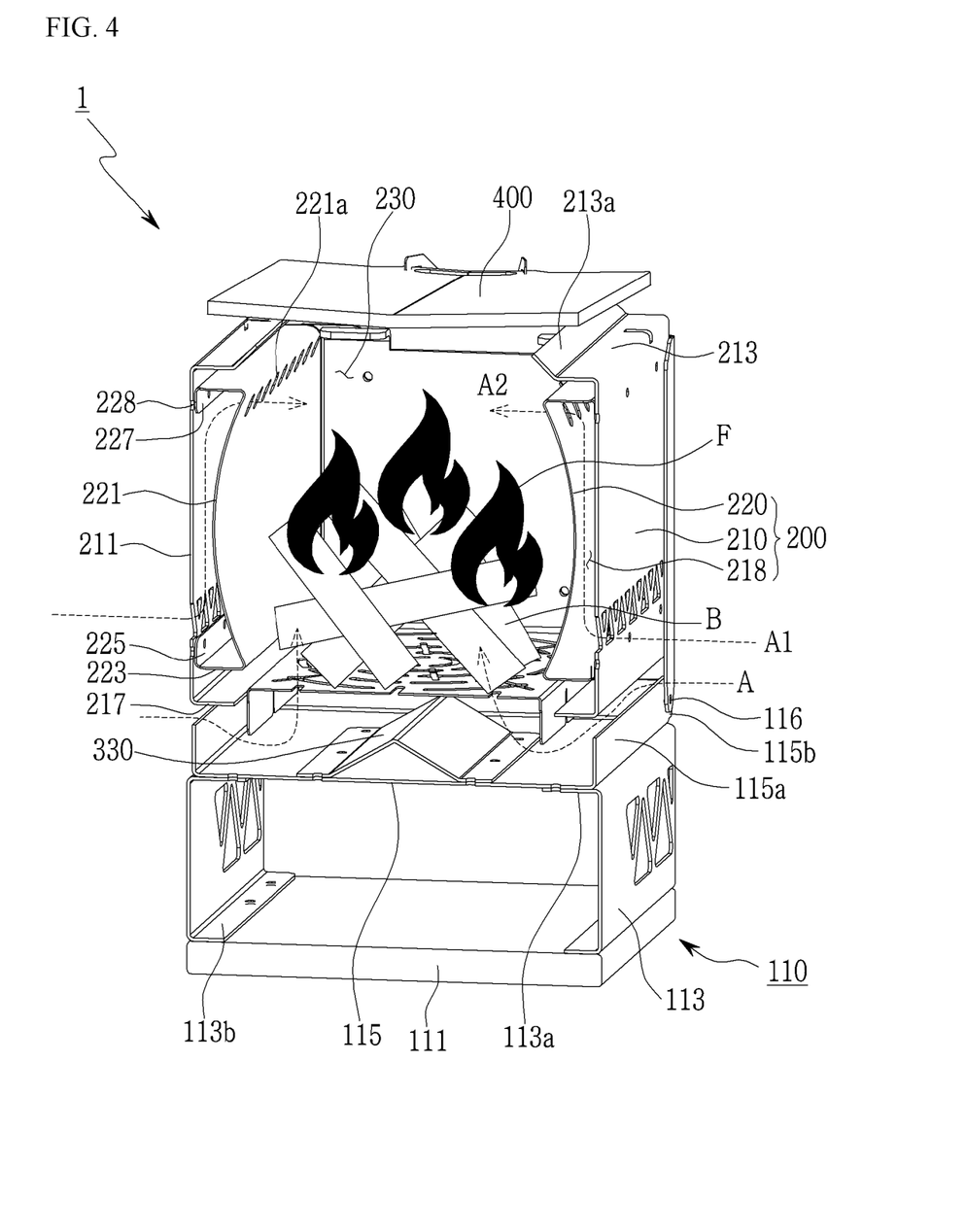
FIG. 4 is a sectional view showing a cross section of the self-assembly brazier for camping according to the present invention.
Figure 5:
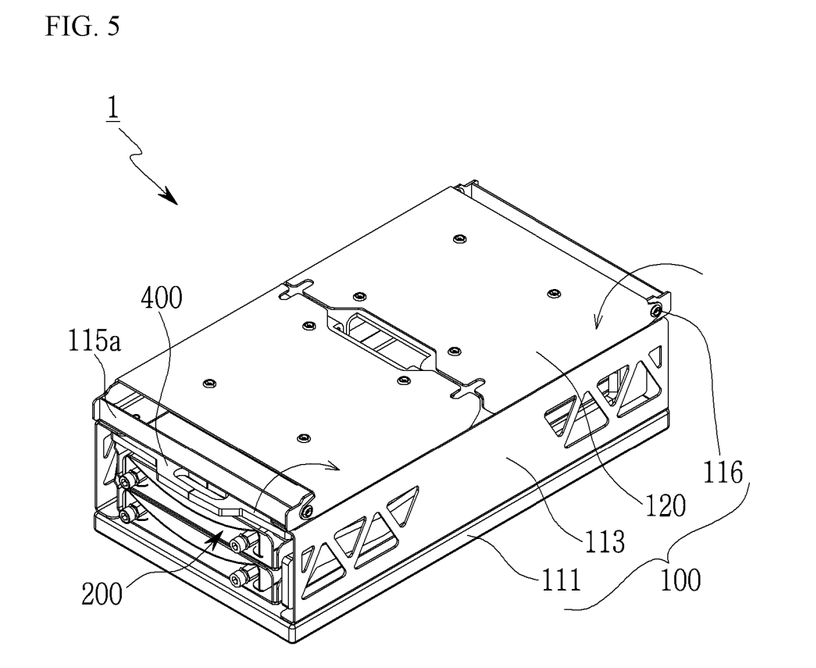
FIG. 5 is an exemplary view showing a process that the self-assembly brazier for camping according to the present invention is stored.

FIG. 1 is a perspective view showing an assembled state of a self-assembly brazier 1 for camping according to the present invention, FIG. 2 is a perspective view showing a roasting plate 400 is combined with the self-assembly brazier 1 for camping according to the present invention, and FIG. 3 is an exploded perspective view showing a structure of the self-assembly brazier for camping according to the present invention FIG. 4 is a sectional view showing a cross section of the self-assembly brazier for camping according to the present invention, and FIG. 5 is an exemplary view showing a folded state of the self-assembly brazier to be stored.

The self-assembly brazier 1 according to the present invention is capable of being assembled and disassembled. If it is not used, the brazier is disassembled as shown in FIG. 5, and then, is stored in a small volume. When the self-assembly brazier 1 is used, as shown in FIG. 1, the brazier is assembled on the camping spot to be used. That is, the self-assembly brazier for camping according to the present invention has an advantage in that it is easy to assemble, disassemble and store.

Moreover, when burning fuel, as shown in FIG. 4, the self-assembly brazier for camping according to the present invention receives outdoor air (A) supplied from below fuel (B) to carry out the first combustion, and then receives second air (A2) with elevated temperature, which moves through the inside of a dual panel 200, to carry out the second combustion, so that complete combustion is carried out. Therefore, the self-assembly brazier for camping according to the present invention has several advantages in that a heating value per unit fuel is increased and time to heat food is reduced due to high thermal efficiency.

The self-assembly brazier 1 for camping according to the present invention includes: a main body 100 which has a storage space and is put on the upper surface of a table; a pair of dual panels 200 assembled to the main body 100 and having a combustion space 230, in which fuel (B) burns, and an air moving space 218; and a combustion plate 300 which is mounted in the combustion space and on which the fuel (B) is loaded.

Moreover, the self-assembly brazier 1 for camping according to the present invention includes a roasting plate 400 for heating food.

As shown in FIG. 5, when the self-assembly brazier 1 is not used, the main body 100 accommodates the dual panels 200, the combustion plate 300, and the baking plate 400 in the storage space 117 of the main body 100. Furthermore, when the self-assembly brazier 1 is used, as shown in FIG. 1, the main body 100 supports the dual panel 200 to be assembled, and supports the baking plate 400 to be put on an upper part thereof.

The main body 100 includes a lower stand 110 having a storage space, and a pair of side coupling wings 120 foldably coupled with both sides of an upper portion of the lower stand 110.

As shown in FIG. 3, the lower stand 110 includes a base plate 111 arranged on the ground surface, a pair of support legs 113 vertically combined with the front and the rear of the base plate 111, and an ash tray 115 combined with upper portions of the support legs 113.

The base plate 111 is made of wood that heat is not transferred. Therefore, a user can put the main body 100 on the upper surface of a camping table. The base plate 111 may be made not only of wood but also one of various materials through which heat is not transferred and which has durability.

The support legs 113 is vertically combined with the front and the rear of the base plate 111 in a longitudinal direction, and the storage space 117 is formed between the base plate 111 and the ash tray 115. The height of the support legs 113 is determined in consideration of thickness of a pair of the dual panels 200 and thickness of the baking plate 400.

An upper bent coupling surface 113a and a lower bent coupling surface 113b are respectively disposed at an upper portion and a lower portion of the support legs 113 in a facing direction. The upper bent coupling surface 113a is coupled with the ash tray 115, and the lower bent coupling surface 113b is coupled with the base plate 111. The base plate 111, the support legs 113, and the ash tray 115 are fixed and coupled by fastening members, such as coupling bolts.

The ash tray 115 is coupled to the upper surfaces of the support legs 113 to form a floor surface of the combustion space 230. Furthermore, the ash tray 115 collects ash of the fuel (B) burning on the combustion plate 300 located in the combustion space 230. After using, the user takes out and discards the ash collected in the ash tray 115.

A border vertical wall 115a is vertically formed on a border area of the ash tray 115 to a predetermined height. As shown in FIG. 1, the border vertical wall 115a covers an interval space between the side coupling wings 120 and the ash tray 115 and an interval space between the dual panels 200 and the ash tray 115 to the predetermined height in an assembled state so as to prevent ash in the ash tray 115 from scattering to the outside.

In this instance, the border vertical wall 115a has the interval space formed from the dual panels 200 to the predetermined height, so that the outdoor air (A) is supplied as the fuel (B) from below the combustion plate 300 after being introduced to the inside through the interval space.

Inner bent shaft coupling holes 115b are formed at both sides of the border vertical wall 115a. Inner bent shafts 116 are inserted into the inner bent shaft coupling holes 115b to support the side coupling wings 120 to be rotated, folded and unfolded. The inner bent shafts 116 are coupled through outer bent shaft coupling holes 122a and the inner bent shaft coupling holes 115b of the side coupling wings 120.

A pair of the side coupling wings 120 are coupled with the upper surface of the ash tray 115 to be folded or unfolded vertically. When the brazier is stored, the side coupling wings 120 is rotated on the inner bent shafts 116 as shown in FIG. 5 so as to be folded onto the upper surface of the ash tray 115 in a horizontal direction.

Figure 7A:
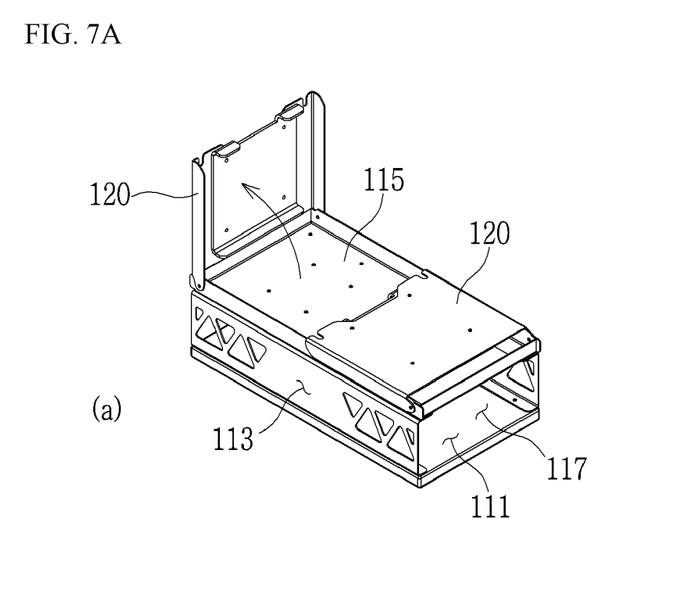
Figure 7B:
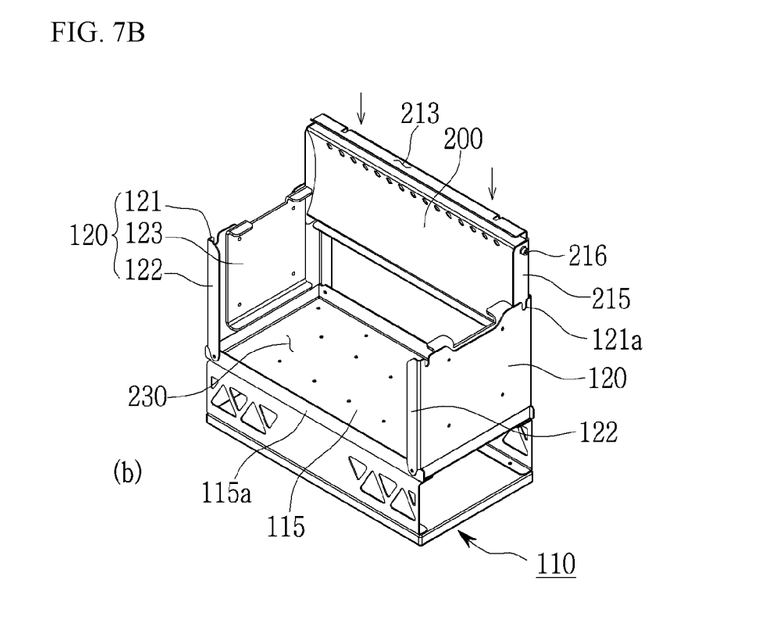

On the contrary, when the brazier is used, as shown in FIG. 7A, the side coupling wings 120 are rotated on the inner bent shafts 116 relative to the ash tray 115 to be unfolded in the vertical direction. The side coupling wings 120 are unfolded at the both sides of the ash tray 115 and are fit, so that a pair of outer panels 210 are fit and assembled as shown in FIG. 7B.

Each of the side coupling wings 120 includes an outer foldable plate 121 arranged outside, and an inner support plate 123 arranged inside the outer foldable plate 121. As shown in FIG. 3, a width of the outer foldable plate 121 corresponds to a width of the ash tray 115 and a length of the outer foldable plate 121 is half of a length of the ash tray 115.

Therefore, when being folded, as shown in FIG. 5, the side coupling wings 120 are arranged side by side not to be overlapped at both sides of the ash tray 115.

The outer foldable plate 121 includes a pair of position fixing bolt insertion grooves 121a formed at an upper portion thereof and hollowed into a predetermined depth downwardly from both sides. As shown in FIG. 7B, when the outer panel is assembled, position fixing bolts 216 protruding outwardly are fit into the position fixing bolt insertion grooves 121a of the upper portion of the outer panel 210.

Figure 7C:
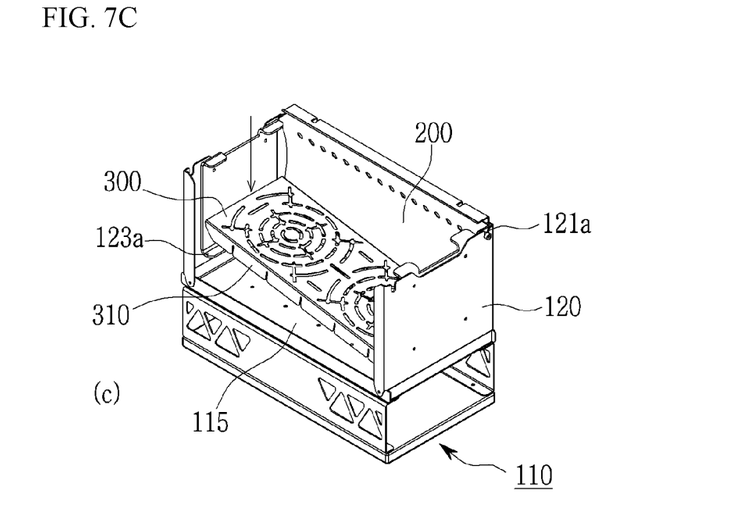

As shown in FIG. 7C, when the position fixing bolts 216 are inserted into the position fixing bolt insertion grooves 121a, the outer panel 210 is fixed and restricted between a pair of the side coupling wings 120.

Panel fitting guide plates 122 bent inwardly to a predetermined area are disposed at both sides of the outer foldable plate 121. As shown in FIG. 7B, the panel fitting guide plates 122 guide the outer panel 210 to be fit well when the outer panel 210 is assembled.

The outer panel 210 is slidably inserted and coupled into the interval space between the panel fitting guide plates 122 and the inner support plate 123.

The outer bent shaft coupling holes 122a are formed at lower portions of the panel fitting guide plates 122, and the inner bent shafts 116 are inserted into the outer bent shaft coupling holes 122a. The side coupling wings 120 are foldable around the inner bent shafts 116 inserted into the outer bent shaft coupling holes 122a.

The inner support plate 123 is fixed on the inner surface of the outer foldable plate 121. The inner support plate 123 is fixed to the outer foldable plate 121 by a plurality of coupling bolts or others. The inner support plate 123 is narrower than the outer foldable plate 121. As shown in FIG. 7B, an interval space is formed between the side border of the inner support plate 123 and the panel fitting guide plates 122 of the outer foldable plate 121.

A width of the interval space is designed to correspond to a thickness of the dual panels 200, and the dual panels 200 are slidably inserted into the interval space.

A combustion plate holding jaw 123a which is bent inwardly to a predetermined area in the horizontal direction is formed at a lower portion of the inner support plate 123. The combustion plate 300 is held on the combustion plate holding jaw 123a to be fixed in position.

Figure 10A:
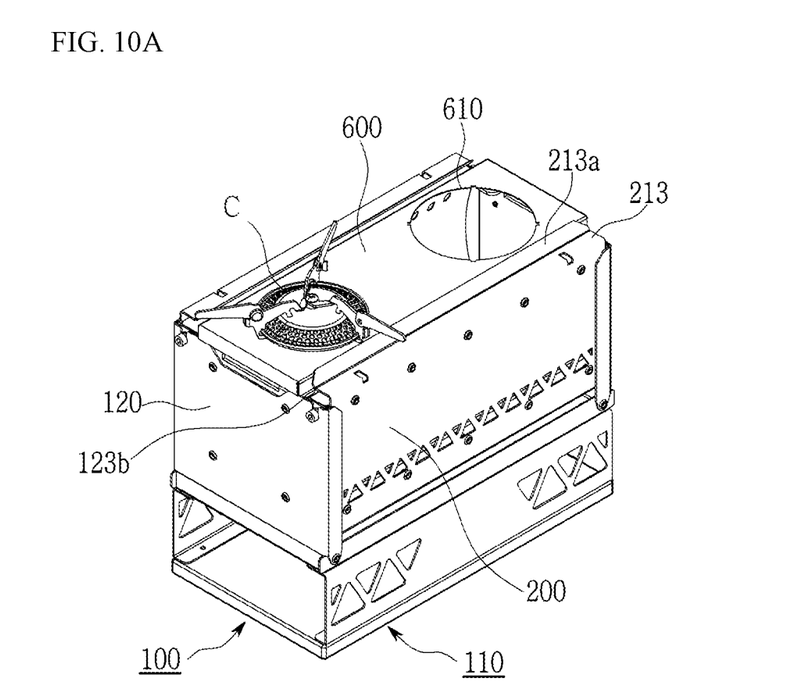

The inner support plate 123 includes a pair of burner kit holding jaws 123b disposed at both sides of an upper portion thereof. As shown in FIG. 10A, the burner kit holding jaws 123b support a gas burner kit 600 to be combined with the upper portion of the inner support plate 123.

The dual panels 200 are fit and coupled at the front and the rear of the side coupling wings 120 to form the combustion space 230 together with the side coupling wings 120. The dual panels 200 are formed such that the outer panel 210 and the inner panel 220, which is coupled to the inside of the outer panel 210 to form the air moving space 218 between the inner panel 220 and the outer panel 210, are coupled with each other.

The dual panels 200 are coupled with the side coupling wings 120 to have a rectangular cross section and to form a housing having the combustion space 230 therein. Each of the outer panels 210 includes an outer panel body 211 arranged vertically, an upper surface 213 horizontally disposed at an upper portion of the outer panel body 211 in the inward direction, a pair of sides 215 bent at both sides of the outer panel body 211, and a lower surface 217 horizontally disposed at a lower portion of the outer panel body 211.

The outer panel body 211 is in a plate form having a predetermined area. A plurality of first air intake holes 211a formed at the lower portion of the outer panel body 211 in the horizontal direction. As shown in FIG. 4, the first air intake holes 211a induces the first air (A1) from the outside into the air moving space 218 formed between the outer panel 210 and the inner panel 220.

The upper surface 213 has a flame guide wing 213a which is inclined inwards at a predetermined angle. The flame guide wing 213a guides the second air (A2) discharged from a second air outlet 221a of the inner panel 220 not to face upwards but to face the inside of the combustion space 230. Therefore, flames (F) generated by meeting the second air (A2) are formed inside the flame guide wing 213a and are not discharged to the outside.

Latch coupling holes 214 are formed at both sides of the upper surface 213. As shown in FIG. 1, when the roasting plate 400 is combined with the self-assembly brazier 1, iron plate latches 420 are coupled to the latch coupling holes 214.

An upper coupling hole 215a and a lower coupling hole 215b are respectively disposed at the upper portions and the lower portions of the sides 215. The position fixing bolts 216 are selectively coupled to any one of the upper coupling hole 215a and the lower coupling hole 215b.

The lower surface 217 is formed on the inner face of the lower portion of the outer panel body 211 to a predetermined area in the horizontal direction. As shown in FIG. 4, the lower surface 217 is formed inwards to a predetermined area so as to prevent the outdoor air (A) introduced into the upper portion of the border vertical wall 155a from moving into the air moving space 218. Therefore, the outdoor air (A) is supplied as the fuel (B) through the combustion plate 300.

The inner panel 220 is coupled to the inner face of the outer panel 210, and forms the air moving space 218 formed between the inner panel 220 and the outer panel 210. As shown in FIG. 4, the inner panel 220 includes an inner panel body 221 arranged inside the outer panel body 211, a lower inside coupling plate 223 extending in the horizontal direction from a lower portion of the inner panel body 221, and an upper inside coupling plate 227 extending from an upper portion of the inner panel body 221.

The inner panel body 221 has an area corresponding to the outer panel body 211. Here, as shown in FIG. 3, the inner panel body 221 is curved to have a curvature protruding toward the outer panel body 211 in a height direction. The reason that the inner panel body 221 is formed to be curved is to minimize thermal transformation by heat generated when the fuel (B) burns. According to circumstances, the inner panel body 221 may be curved to have a curvature in a width direction.

When heat is transferred by flames, the curved-shaped inner panel body 221 receives heat uniformly in all areas. Therefore, thermal transformation, such as shrivel of the inner panel body 221 by heat, can be minimized.

A plurality of second air outlets 221a are formed at the upper portion of the inner panel body 221 in the width direction to penetrate through the inner panel body 221. As shown in FIG. 4, the second air outlets 221a discharge the second air (A2), which is moved upwards along the air moving space 218, toward the combustion space 230.

The first air (A1) introduced into the air moving space 218 through the first air intake holes 211a receives heat generated from the combustion space 230 to raise temperature while ascending upwards. The second air (A2) with the elevated temperature is supplied to the combustion space 230 as the fuel (B) and combustion gas so that second combustion of the fuel (B) is carried out.

The lower inside coupling plate 223 and the upper inside coupling plate 227 extend to have the same thickness as the lower surface 217, and are spaced apart from each other to form the air moving space 218 between the inner panel body 221 and the outer panel body 211. A lower coupling bent plate 225 and an upper coupling bent plate 228, which are respectively bent upwards and downward and are fixed and coupled to the outer panel body 211 by fastening members, are respectively disposed at end portions of the lower inside coupling plate 223 and the upper inside coupling plate 227.

The combustion plate 300 is arranged in the combustion space 230 to support the fuel (B) loaded on the upper surface thereof to burn. The combustion plate 300 has a discharge hole 310 formed to penetrate through the plate surface of the combustion plate 300. The discharge hole 310 serves to supply the outdoor air (A) introduced between the dual panels 200 and the ash tray 115 as the fuel (B).

Holding legs 320 of a predetermined height are disposed at both sides of the combustion plate 300.

As shown in FIG. 7B, the combustion plate 300 is arranged in the combustion space 230 after the dual panels 200 are coupled to the side coupling wings 120. In this instance, the user put both sides of the combustion plate 300 on the combustion plate holding jaws 123a of the side coupling wings 120 to fix the position of the combustion plate 300.

As shown in FIG. 2, the baking plate 400 is held on the upper portion of the self-assembly brazier 1 so that food (M) is cooked by heat generated through combustion of the fuel (B).

The baking plate 400 may be made of various materials, and preferably, may be made of a SPHC material. The baking plate 400 is 6 mm in thickness and has durability to be used semi-permanently.

The baking plate 400 has handgrips 410 disposed at both sides. Each of the handgrips 410 has a lifter insertion hole 411.

The baking plate 400 is put on the upper portions of a pair of the outer panels 210 using the iron plate latches 420. The iron plate latches 420 make the baking plate 400 inclined, so that oil generated from meat drops down when the user roasts meat.

The iron plate latches 420 have latch legs 421 formed to a predetermined height, and the latch legs 421 are detachably coupled to the latch coupling holes 214 formed in the upper surface of the outer panel 210.

When the roasting plate 400 is put on the outer panels 210 by the iron plate latches 420, a drip pan 430 is detachably coupled to a lower portion of the inclined roasting plate 400 to receive oil. The drip pan 430 has fitting grooves 431 so that the drip pan 430 is fit to edges of the roasting plate 400 to be fixed.

Referring to FIGS. 1 to 8, processes to store, assemble and use the self-assembly brazier 1 for camping according to the present invention will be described.

When the brazier 1 is not used, as shown in FIG. 5, a pair of the dual panels 200, the combustion plate 300 and the roasting plate 400 are received into the main body 100, and a pair of the side coupling wings 120 are folded onto the upper surface of the ash tray 115 to be minimized in volume.

As occasion demands, the self-assembly brazier 1 minimized in volume can be stored in a storage bag (not shown).

Figure 6:
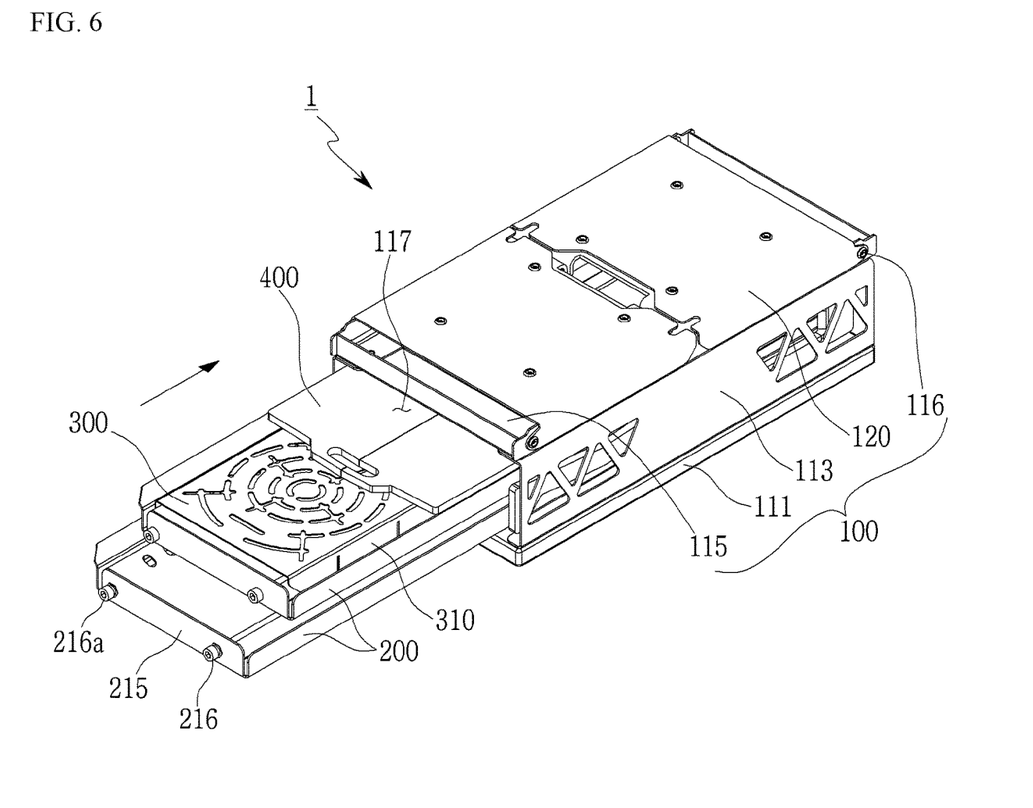
FIG. 6 is an exemplary view showing a state where the self-assembly brazier for camping according to the present invention is stored.

In this instance, as shown in FIG. 6, the dual panels 200 are arranged to be overlapped with each other, and the roasting plate 400 is loaded on the dual panels 200. The dual panels 200 and the roasting plate 400 put on one another are pushed into the storage space 117 of the main body 100 to be stored.

When the self-assembly brazier 1 is used on a camping ground, the user can directly assemble it on the spot.

As shown in FIG. 6, the user takes out the dual panels 200 and the roasting plate 400 stored in the storage space 117.

After that, as shown in FIG. 7A, the user rotates a pair of the side coupling wings 120 around the inner bent shafts 116 in the vertical direction so as to unfold the side coupling wings 120. As shown in FIG. 7B, the user fits and couples a pair of the outer panels 210 between the side coupling wings 120 unfolded vertically.

The user fit the outer panels 210 between the panel fitting guide plate 122 and the inner support plate 123. After that, as shown in FIG. 7C, the user inserts the position fixing bolts 216 of the outer panels 210 into the position fixing bolt insertion grooves 121a of the side coupling wings 120 to fix the outer panels 210.

When the outer panels 210 are fixed, the user inserts the combustion plate 300 into the combustion space 230, and puts the combustion plate 300 on the combustion plate holding jaws 123a of the side coupling wings 120, then, assembly is finished.

Here, as occasion demands, a combustion plate reinforcing member 330 is arranged below the combustion plate 300.

When assembly of the self-assembly brazier 1 for camping is finished, as shown in FIG. 4, the user puts the fuel (B) on the upper surface of the combustion plate 300 and lights fire. The outdoor air (A) is introduced through the interval space between the outer panels 210 and the border vertical wall 115a as the fuel (B), so that the fuel (B) burns first.

After that, the first air (A1) is introduced into the first air intake holes 211a of the outer panel 210. The first air (A1) introduced into the first air intake holes 211a moves upwards along the air moving space 218. In this process, temperature of the first air rises by heat generated during the combustion process of the fuel.

The second air (A2) with elevated temperature is supplied to the combustion space 230 through the second air outlets 221a of the inner panels 220 and meets first burnt flames and combustion gas. Therefore, the flames and the combustion gas burn second so that complete combustion is induced. Due to the complete combustion, temperature of the flames rises and thermal efficiency increases.

When the fuel (B) burns, the user moves the brazier 1 onto the upper surface of a camping table to use the brazier 1 on the table. Because the base plate 111 of the brazier 1 is made of wood through which heat is not transferred, the user can use the brazier in safety without transmission of heat to the table.

The user can make food when coupling the roasting plate 400 on the upper portion of the brazier 1.

Figure 8A:
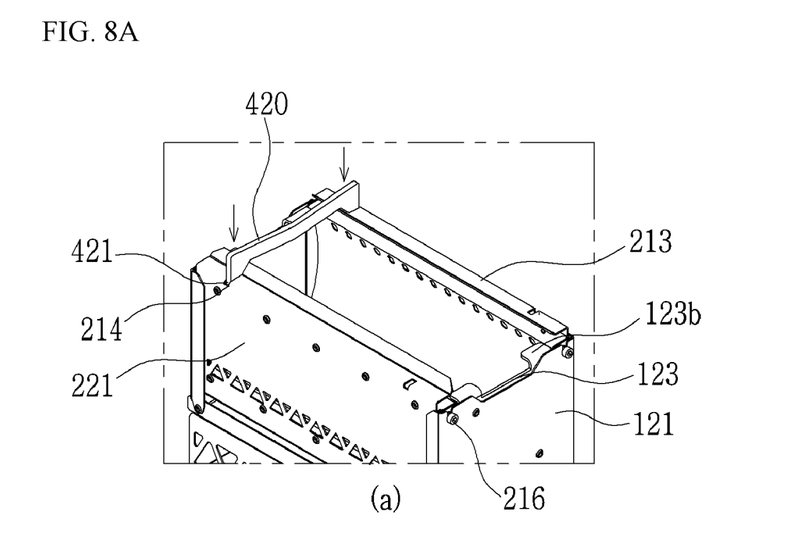
Figure 8B:
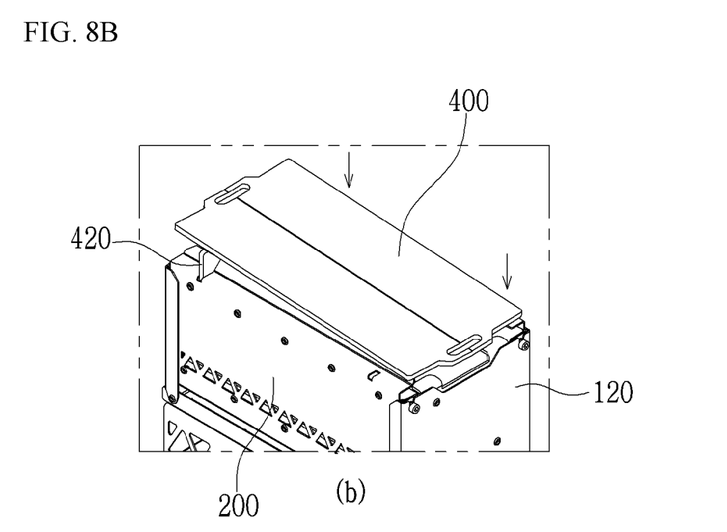

As shown in FIG. 8A, the user couples the iron plate latches 420 to any one of the latch coupling holes 214. As shown in FIG. 8B, the user puts the roasting plate 400 on the iron plate latches 420 and the upper surfaces 213 to be inclined.

Figure 8C:
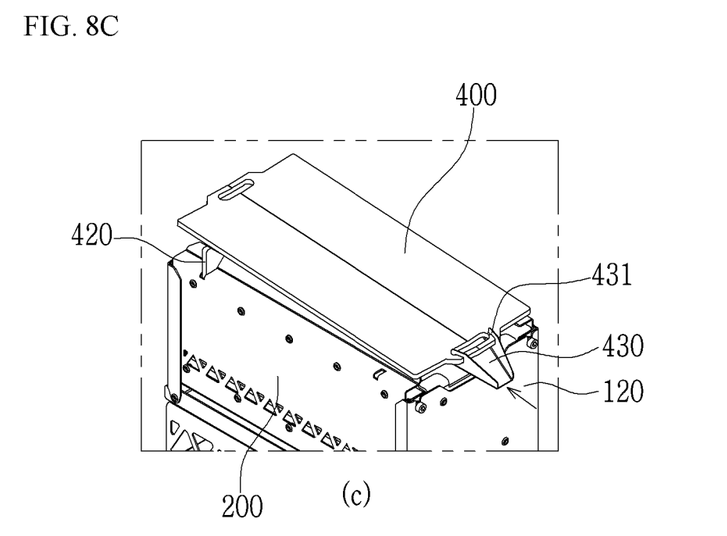

As shown in FIG. 8C, the user couples the fitting grooves 431 of the drip pan 430 to a lower end portion of the roasting plate 400 in order to make various kinds of food as well as meat.

After the use, the heated roasting plate 400 can be separated from the upper portion of the dual panels 200 by using a lifter 440 as shown in FIG. 2. The lifter 440 is fit into the lifter insertion hole 411 of the handgrip 410.

Figure 9:
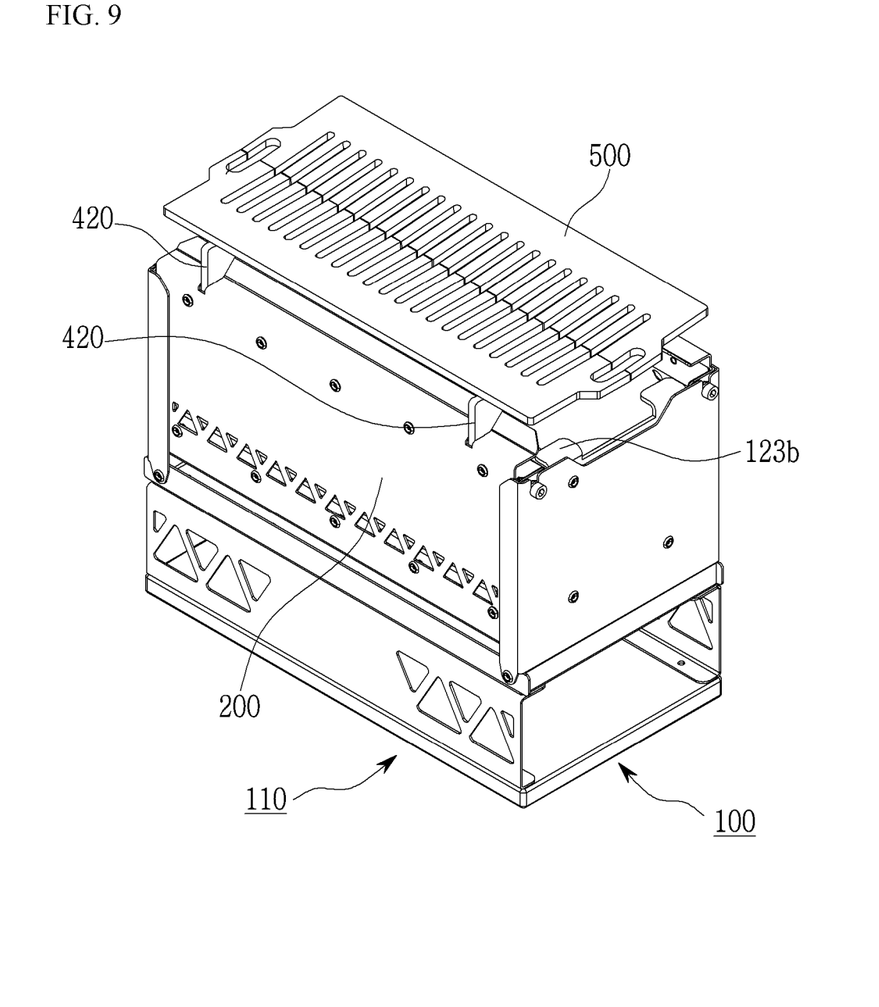
FIGS. 9, 10A and 10B are views showing various examples of a used state of the self-assembly brazier for camping according to the present invention.
Figure 10B:
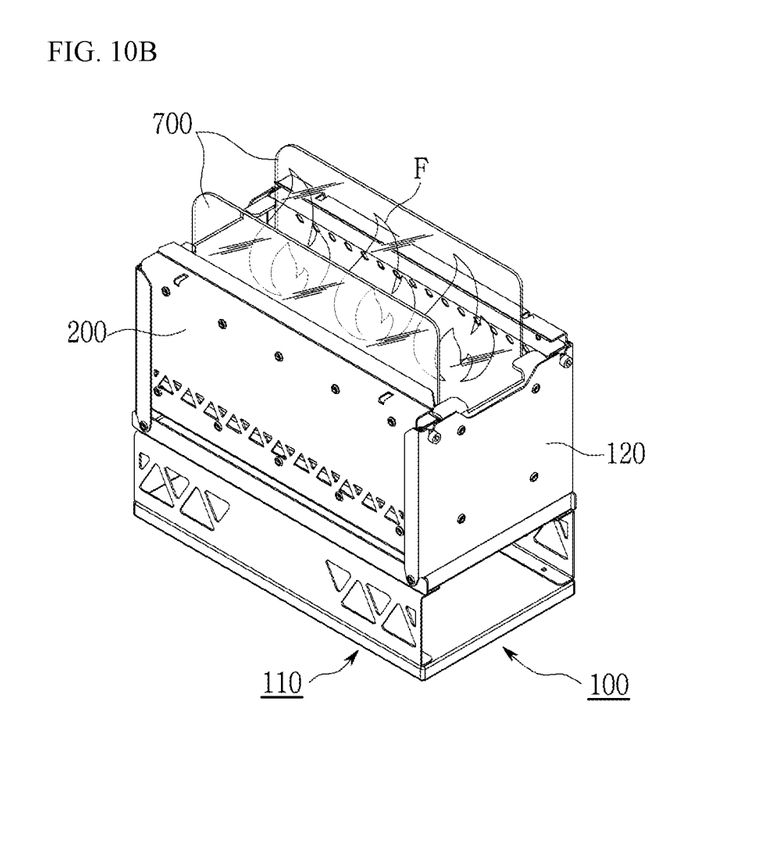

In the meantime, FIGS. 9 and 10 illustrate various examples of the self-assembly brazier 1 for camping according to the present invention.

The self-assembly brazier 1 for camping selectively provides a grill 500, a gas burner kit 600, and an alcohol fireplace kit 700 besides the roasting plate 400.

As shown in FIG. 9, the user can make food in a direct fired manner when putting the grill 500 on the brazier 1. In this instance, the user can put the grill 500 horizontally using a pair of the iron plate latches 420.

Additionally, as shown in FIG. 10A, the user can couple the gas burner kit 600 to the upper portion of the brazier 1.

In this instance, the user does not fill fuel in the combustion space 230 but couples a burner (C) to the gas burner kit 600. The gas burner kit 600 is inserted between the upper surfaces 213 of the outer panels 210 to be fixed in position.

The gas burner kit 600 has one or more gas burner insertion holes 610 to which the burner (c) is coupled.

Meanwhile, as shown in FIG. 10B, the alcohol fireplace kit 700 may be coupled to the upper portion of the self-assembly brazier 1.

As described above, the self-assembly brazier for camping according to the present invention can minimize its volume and is easy to store since the dual panels, the combustion plate and the roasting plate are received in the main body.

Moreover, the self-assembly brazier for camping according to the present invention is convenient since being completely assembled by the simple process of unfolding a pair of the side coupling wings, fitting a pair of the dual panels and putting the combustion plate thereon.

Furthermore, the self-assembly brazier for camping according to the present invention can reduce the user's physical strain since having the floor made of wood through which heat is not transferred so that the brazier can be arranged not only on the ground but also on a table.

Additionally, the self-assembly brazier for camping according to the present invention can induce complete combustion to minimize thermal efficiency per unit fuel since supplying not only the outdoor air supplied from below the fuel but also second air of elevated temperature above the fuel.

The technical thoughts of the present invention have been described hereinafter.

It is to be appreciated that those skilled in the art can change or modify the embodiments from the above description. Although it is not clearly illustrated or described herein, it is to be appreciated that those skilled in the art can change or modify the embodiments from the above description without departing from the scope and spirit of the present invention. While the present invention has been described with reference to the particular illustrative embodiments, it is not to be restricted by the embodiments but only by the appended claims.

What is claimed is:

1. A self-assembly brazier for camping comprising:
 a main body including a base plate arranged on the ground, an ash tray arranged to be spaced apart from the base plate by a pair of support legs vertically arranged at both sides of the base plate, a pair of side coupling wings foldably coupled to both sides of an upper surface of the ash tray, and a storage space formed between the base plate and the ash tray;
 a pair of dual panels detachably fit and coupled between the side coupling wings when the side coupling wings are vertically unfolded relative to the ash tray, so as to form a combustion space together with the ash tray;
 a combustion plate detachably arranged in the combustion space to which the dual panels are coupled, and having an upper surface on which fuel is arranged;
 a roasting plate loaded on upper surfaces of the dual panels so that a user can cook food; and
 iron plate latches detachably coupled to one side of upper portions of the dual panels to make the roasting plate inclined, wherein:
  the dual panels separated from the side coupling wings and the combustion plate separated from the combustion space are stored in the storage space;
  the side coupling wings separated from the dual panels are horizontally folded onto the upper surface of the ash tray; and
  the roasting plate is stored in the storage space.

* * * * *